Patented Dec. 25, 1928.

1,696,873

UNITED STATES PATENT OFFICE.

ROBERT T. WOOD, OF NIAGARA FALLS, NEW YORK, ASSIGNOR TO AMERICAN MAGNESIUM CORPORATION, A CORPORATION OF NEW YORK.

MAGNESIUM PRIMARY CELL.

No Drawing.   Application filed August 5, 1925. Serial No. 48,385.

The invention relates to primary, or voltaic, cells or batteries of either the wet or so-called "dry" type, which make use of a substantially neutral electrolyte in connection with suitable electrodes.

It would seem that a relatively high voltage primary cell would be obtained by using a suitable positive electrode with magnesium as the negative electrode and I am aware that attempts have been made to develop such a cell. As far as I am aware, however, these have all been unsuccessful, and it has been generally accepted that magnesium could not be commercially utilized as a primary cell electrode.

One object of the invention is to make feasible the use of magnesium or magnesium base alloys as a negative electrode in primary cells by minimizing corrosion of the metal on open circuit, so that the cell will compare favorably in life with the common "dry cell" or the Leclanché cell.

Another object of the invention is to provide a cell which develops a substantially higher voltage than the Leclanché cell or the usual "dry cell".

These objects are rendered feasible and commercially practicable by the use of a suitable and novel electrolyte, whose advantages and use will be described more fully in the following specification.

The Leclanché cell makes use of a negative electrode of zinc and a positive one of carbon in conjunction with an electrolyte containing ammonium chloride. In order to maintain the voltage of the cell during use, a depolarizer, such as solid manganese dioxide, is used.

This type of cell is used extensively for so-called open circuit work, where the battery is not required constantly to supply a current, such uses being bell circuits, gasoline engine ignition, etc. In the most common form it is made up as the well-known "dry" cell.

Magnesium stands near the top of the electrochemical series and because of its high solution potential a much higher voltage should be produced if the zinc of the Leclanché cell is replaced by magnesium. However, magnesium will corrode so rapidly in ammonium chloride solution that the cell becomes valueless in a few hours, even on open circuit. The same disadvantage applies to all the commercially used primary cell electrolytes.

I have discovered, however, that this corrosion of magnesium or magnesium base alloys will be greatly decreased or even practically inhibited by the use of an electrolyte which contains one or more strong oxidizing agents in solution. The amount of protection offered by the use of such an electrolyte depends upon the composition of the solution and the oxidizing agent utilized. In general, it may be said that a substantially neutral or basic electrolyte is more effective for this purpose than is one which shows an acid reaction.

I have found that salts of chromic acid, particularly sodium and potassium dichromates, and the nitrates of the alkali and alkaline earth metals are especially effective for reducing electro-chemical corrosion of magnesium or magnesium base alloys. With the alkali metals I include also the ammonium radical, which behaves much like them in certain reactions and is generally classed with them for analytical purposes.

The base of the electrolyte in which the oxidizing agent is dissolved may be an aqueous solution of any of a large number of chemical compounds. The chlorides of the alkali and alkaline earth metals and the sulphates and chlorates of the alkali metals are particularly suitable.

As an example of an electrolyte suitable for the performance of my invention, and which will not corrode magnesium appreciably on open circuit, the following compositions may be given:—

|  | Parts by weight. |
|---|---|
| Ammonium chloride | 2 |
| Ammonium nitrate | 1 |
| Sodium dichromate | 1 |
| Water | 8 |

In order to maintain the voltage of the cell, I preferably use manganese dioxide as a depolarizer in the usual manner. A cell composed of this electrolyte in conjunction with carbon and pure magnesium electrodes will develop about 2 volts as compared with 1.6 volts for carbon and zinc electrodes in the ordinary Leclanché cell.

The following examples demonstrate the efficacy of my electrolyte as compared with the common ammonium chloride solution:

Two simple cells were constructed, one electrode of each being a carbon rod seven-eighths inch in diameter. The other electrode of each was a piece of commercially pure magnesium sheet, one inch wide and 0.05 inch thick. A solution of 25 grams ammonium chloride in 100 cc. water was placed in one cell; the electrolyte in the other was made up according to the preferred proportions given above. The amount of solutions was such that all electrodes were immersed to a depth of one inch.

The magnesium electrode in the simple ammonium chloride solution was attacked immediately by the electrolyte, and there was a very brisk evolution of gas, which possessed the odor characteristic of ammonia. After four hours' immersion half of the portion in the solution had been eaten entirely away, and the remainder was but 0.006 inches thick and penetrated by many holes.

On the other hand, the magnesium electrode immersed in the electrolyte made up in accordance with my invention was not visibly attacked. The evolution of gas was so slight as to be almost imperceptible and no diminution in thickness could be detected with a micrometer after 24 hours, nor was any pitting visible. This cell developed a potential of 1.4 volts, measured on open circuit, and the straight ammonium chloride cell, measured in the same manner, produced 1.5 volts.

By applying a pasty mass of finely powdered manganese dioxide to the carbon electrodes, the cell made up in accordance with my invention showed an electromotive force of 2.0 volts on open circuit, and the other cell generated 2.2 volts. An ordinary dry cell will develop about 1.6 volts.

The lower voltage of my cell as compared with one made by using carbon and magnesium electrodes in a solution of ammonium chloride appears to be due to the presence of oxidizing agents in solution, which tend to lower somewhat the solution tension of metallic electrodes immersed therein and therefore lower the theoretical voltage of the cell. Metallic magnesium, however, has such a high solution tension that even with the concentrations of oxidizing agents necessary to inhibit corrosion, the cell will still develop a higher voltage than one containing another metal, such as zinc, in place of magnesium.

It is well known in the art that metals or alloys used as electrodes should be as free as possible from impurities or constituents which form galvanic local couples in the presence of an electrolyte. Such couples enhance greatly local corrosion of the electrode, thereby shortening the life of the cell. This requirement applies to all metallic electrode material and equally well to magnesium and its alloys. Likewise the electrolyte should not contain metals which are capable of being precipitated as such on the magnesium electrode, as these also will cause local action.

Magnesium base alloys which are resistant to corrosion can be employed in my cells and I have found magnesium base alloys containing aluminum and manganese to be particularly applicable.

It will be apparent that other electrolyte compositions may be applied than that described and other oxidizing agents may be utilized without departing from the spirit of the invention, the aforementioned compositions being cited not as limitations, but merely as examples suitable for the accomplishment of my invention.

In using the term "magnesium" in the claims, I comprehend not only the pure metal, as commercially produced, but also such alloys, composed chiefly of magnesium, as lend themselves to the same use.

I claim:

1. A primary cell comprising an electrode of magnesium and a neutral electrolyte containing a strong soluble oxidizing agent adapted to reduce the rate of corrosion of the magnesium electrode on open circuit.

2. A primary cell comprising an electrode of magnesium and a neutral electrolyte containing a salt of chromic acid adapted to reduce the rate of corrosion of the magnesium electrode on open circuit.

3. A primary cell comprising an electrode of magnesium and a neutral electrolyte containing the dichromate of an alkali metal adapted to reduce the rate of corrosion of the magnesium electrode on open circuit.

4. A primary cell comprising an electrode of magnesium and a neutral electrolyte containing salts of chromic and nitric acids adapted to reduce the rate of corrosion of the magnesium electrode on open circuit.

5. A primary cell comprising an electrode of magnesium and a neutral electrolyte containing the dichromate of an alkali metal and the nitrate of an alkali metal adapted to reduce the rate of corrosion of the magnesium electrode on open circuit.

6. A primary cell comprising a negative electrode of magnesium and a substantially neutral solution of an oxidizing agent in contact therewith adapted to reduce the rate of corrosion of the said electrode on open circuit.

7. A primary cell comprising an electrode of magnesium and an electrolyte containing ammonium chloride and sodium dichromate.

8. A primary cell comprising an electrode of magnesium and an electrolyte containing ammonium chloride, ammonium nitrate and sodium dichromate.

9. A primary cell comprising a negative electrode of magnesium and an electrolyte having as its base a substantially neutral reagent, which on open circuit will rapidly corrode magnesium, the said electrolyte containing in addition to the said base another reagent which causes a reduction in the rate of corrosion of the said electrode on open circuit.

In testimony whereof I affix my signature.

ROBERT T. WOOD.